United States Patent
Feltz et al.

(10) Patent No.: US 6,842,329 B2
(45) Date of Patent: Jan. 11, 2005

(54) CERAMIC MASS AND A CAPACITOR HAVING THE CERAMIC MASS

(75) Inventors: Adalbert Feltz, Deutschlandsberg (AT); Peter Sedlmaier, Ruden (AT)

(73) Assignee: Epcos AG, München (DE)

( * ) Notice: Subject to any disclaimer, the term of this patent is extended or adjusted under 35 U.S.C. 154(b) by 0 days.

(21) Appl. No.: 10/333,752

(22) PCT Filed: May 8, 2001

(86) PCT No.: PCT/DE01/01739

§ 371 (c)(1),
(2), (4) Date: Aug. 22, 2003

(87) PCT Pub. No.: WO02/06184

PCT Pub. Date: Jan. 24, 2002

(65) Prior Publication Data

US 2004/0023785 A1 Feb. 5, 2004

(30) Foreign Application Priority Data

Jul. 19, 2000 (DE) .......................... 100 35 172

(51) Int. Cl.$^7$ ............................. H01G 4/06; C03C 3/00; C04B 35/46
(52) U.S. Cl. ................................ 361/321.2; 361/321.4; 361/321.5; 361/311; 501/134; 501/137
(58) Field of Search ...................... 361/311–313, 321.2, 361/321.4, 321.5, 321.6, 322

(56) References Cited

U.S. PATENT DOCUMENTS

| | | |
|---|---|---|
| 5,264,403 A | 11/1993 | Abe et al. |
| 5,292,694 A | 3/1994 | Abe et al. |
| 5,304,521 A | 4/1994 | Abe et al. |
| 5,350,721 A | 9/1994 | Abe et al. |
| 5,458,981 A | 10/1995 | Abe et al. |
| 5,479,140 A | 12/1995 | Abe et al. |
| 5,485,132 A | 1/1996 | Abe et al. |
| 5,488,019 A | 1/1996 | Abe et al. |
| 5,493,262 A | 2/1996 | Abe et al. |

FOREIGN PATENT DOCUMENTS

| | | |
|---|---|---|
| DE | 197 49 858 | 4/1999 |
| DE | 198 41 487 | 3/2000 |
| EP | 0 534 801 | 3/1993 |
| EP | 0 534 802 | 3/1993 |
| EP | 0 926 107 | 6/1999 |

*Primary Examiner*—Anthony Dinkins
(74) *Attorney, Agent, or Firm*—Schiff Hardin LLP

(57) ABSTRACT

A ceramic mass has a phase-heterogeneous ceramic of m weight percent of a phase composed of $BaNd_2Ti_4O_{12}$ with negative temperature coefficient of the dielectric constant and 100-m weight percent of a phase composed of $Nd_2Ti_2O_7$ with positive temperature coefficient of the dielectric constant, with m having a value of 50<m<70, and an additive of glass frit that contains ZnO, $B_2O_3$ and $SiO_2$ and whose weight amounts to between 3 and 10 weight percent of the ceramic. The ceramic mass is used to construct a multi-layer capacitor with copper electrodes.

10 Claims, 1 Drawing Sheet

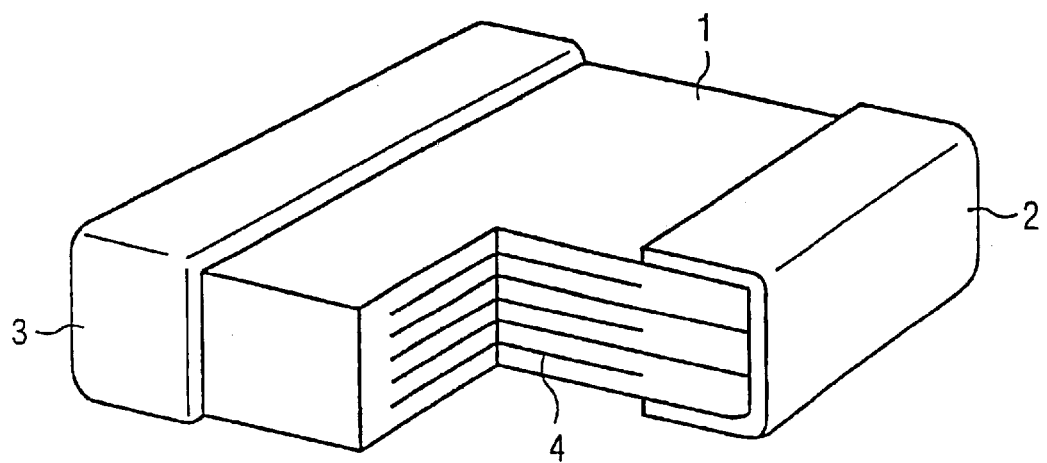

CERAMIC MASS AND A CAPACITOR HAVING THE CERAMIC MASS

BACKGROUND OF THE INVENTION

The invention is directed to a ceramic mass having a combination of a ceramic and a glass frit and to a capacitor having this ceramic mass.

Ceramic masses are known that are employed as a dielectric for multi-layer capacitors with metal electrodes. For cost reasons, copper is preferred as an electrode material. Given the employment of copper as the electrode material, however, it is necessary to reduce the sintering temperature of the ceramic mass below the melting temperature of the copper since the multi-layer capacitors are manufactured by a common sintering of the ceramic with the electrodes.

Technical solutions have already been disclosed that allow the common sintering of a ceramic mass with the Cu electrodes under reducing conditions, whereby the sintering temperature is lowered below the melting temperature of the copper (1083° C.). Specific sintering aids, preferably additives of the glass frits whose material basis is a system containing lead oxide and/or bismuth oxide, are utilized for this purpose. An oxygen partial pressure $<10^{-2}$ Pa must be employed in order to suppress the oxidation of the copper during the sintering in the region of 1000° C. At the same time, a critical lower limit of the oxygen partial pressure dare not be downwardly transgressed since otherwise the ceramic or a constituent of the glass frit added in the manufacture is subjected to a reduction, which necessarily leads to a lowering of the insulation resistance and an inadmissible increase of the dielectric losses. In order to avoid a local downward transgression of this critical lower limit, the decarbonization of the green member employed in the manufacture must have been completely realized before the beginning of the sintering.

EP 0 534 802 A1, U.S. Pat. No. 5,479,140, U.S. Pat. No. 5,493,262, U.S. Pat. No. 5,488,019, U.S. Pat. No. 5,485,132 disclose ceramic masses of the material systems $BaO—TiO_2—(RE)_2O_3$ wherein the oxide of the rare earth metals (RE) can be partially replaced by $Bi_2O_3$ and the sintering compression thereof already partially succeeding at 900° C. in that glass frit parts that contain CdO, PbO or $Bi_2O_3$ or glasses of the system $ZnO—B_2O_3—SiO_2$ are added. This enables a common sintering with Ag electrodes in air. Compared to a partial reduction that results in a lowering of the insulation resistance and an increase in the dielectric losses, the systems prove insufficiently stable for a common sintering with the copper electrodes under inert conditions, for example in a nitrogen atmosphere.

EP 0 534 801 A1, U.S. Pat. No. 5,458,981 and U.S. Pat. No. 5,292,694 likewise disclose $BaO—TiO_2—SE_2O_3$ ceramic masses in conjunction with the glass additives containing $B_2O_3$ and ZnO for the purpose of the common sintering with silver electrodes. In these instances, too, the decarbonization upon air admission prevents the combination with copper electrodes, so that recourse must be had to silver or silver/palladium alloys. The advantage of a cost-beneficial employment of the silver electrodes is opposed by the disadvantage of the high mobility of the silver, particularly at high temperature, that can lead to the migration effects and a deterioration of the dielectric properties resulting therefrom.

According to DE 197 49 858, the materials system $BaO—PbO—Nd_2O_3—TiO_2$ used for the manufacture of the COG capacitors and microwave resonators with a high dielectric constant (DK) is tapped in the region of the phase formation of rhombic bronzes $(Ba_{1-y}Pb_y)_{6-x}Nd_{8+2x/3}Ti18O54$ with $0.6 <x<2.1$ and $0<y<0.6$ for a sintering at temperatures <1030° C. and, thus, for the common sintering with the Cu electrodes in that the sintering aids, preferably PbO-free glass frits having a specific composition are added and a complete decarbonization in nitrogen is achieved due to the action of a water steam at an elevated temperature upon utilization of the steam reforming process known from crude oil processing. It must be noted as a limitation on this technical solution that the stability of the ceramic is limited by the PbO content, which requires an especially careful decarbonization and an extremely careful avoidance of too low an oxygen partial pressure. The two demands are linked to one another since, in particular, the inadmissible downward transgression of the critical oxygen partial pressure limit caused by the slight organic residual constituents must also be locally avoided. Otherwise, a eutectic Pb/Cu alloy is formed that melts at 954° C., which leads to an electrode run out.

Systems free of PbO and $Bi_2O_3$ have proven suited for avoiding such a disadvantage. DE 198 41 487 A1 disclosed the PbO-free materials system $BaO—Nd_2O_3—Sm_2O_3—TiO_2$ in the region of the phase formation of the rhombic bronzes $Ba_{6-x}(Sm_yNd_{1-y})_{8+2x/3}Ti_{18}O_{54}$ for the manufacture of the COG capacitors and microwave resonators, whereby a temperature coefficient of the capacitance TKC<30 ppm/K or, respectively, a temperature coefficient of the resonant frequency $TKv_0$<10 ppm/K is designationally set by means of a suitable selection of the composition parameters x and y, and a sintering at temperatures <1030° C. and, thus, a common sintering with the Cu electrodes is simultaneously achieved in that a glass frit with a suitable composition is added in an appropriate amount. The use of this advantage assumes that the rhombic bronzes of the appertaining composition are completely formed as a uniform phase before the sintering, which makes the relatively high conversion temperature of 1250° C. necessary in the calcination of the mixture of the oxide raw materials $BaCO_3$, $Nd_2O_3$ and $TiO_2$.

SUMMARY OF THE INVENTION

An object of the present invention is therefore to offer a ceramic mass suitable for capacitors that can be manufactured from the oxide raw materials by calcination at a temperature of at the most 1240° C. Further, the ceramic mass should be capable of being sintered at a temperature <1030° C. and should exhibit a low temperature coefficient of the dielectric constant.

This object is inventively achieved by a ceramic mass that contains a phase-heterogeneous ceramic and an additive admixture of glass frit. The phase-heterogeneous ceramic comprises m weight percent of a first phase and 100-m weight percent of a second phase. The first phase is composed of $BaNd_2Ti_4O_{12}$ with a negative temperature coefficient of the dielectric constant, whereas the second phase is composed of $Nd_2Ti_2O_7$ with a positive temperature coefficient of the dielectric constant. 50<m<70 thereby applies to the mixing parameter m. The glass frit contains zinc oxide, boron oxide and silicon oxide and has a weight that amounts to between 3 and 10 weight percent of the phase-heterogeneous ceramic.

In addition to the constituents, the ceramic mass can also contain slight amounts of other, standard constituents that do not deteriorate the desired properties of the ceramic.

The inventive ceramic mass has the advantage that the phase-heterogeneous ceramic, which is contained in it, can already be manufactured from the raw materials barium carbonate, neodymium oxide and titanium oxide by calcination at a temperature of 1180° C. Due to the comparatively low calcination temperature, the inventive ceramic mass can be manufactured with a low heat expenditure. The inventive ceramic mass has the further advantage that it exhibits a high dielectric constant $\epsilon > 50$.

Over and above this, the inventive ceramic mass has the advantage that it can be sintered at temperatures <1030° C., as a result whereof the common sintering with the copper electrodes becomes possible.

In an especially advantageous embodiment of the invention, the glass frit in the ceramic mass comprises the following composition: $(ZnO)_{58.5}(B_2O_3)_{31.45}(SiO_2)_{10.05}$.

The invention also specifies a capacitor wherein the inventive ceramic mass is employed as the dielectric. The dielectric forms a base body that comprises a respective contact layer at two opposite sides. The contact layers are contacted to electrodes that are located in the inside of the base body and inter-engage comb-like. Since the ceramic mass employed in the capacitor contains neither lead oxide nor bismuth oxide, the ceramic mass is especially stable with respect to the influences with a reducing effect, so that the capacitor has the advantage of a stable capacitance over the long-term.

In an especially advantageous embodiment of the capacitor, the electrodes are composed of copper and are sintered together with the ceramic mass. Copper has the advantage that it is inexpensive to acquire and exhibits high conductivity. As a result thereof, the capacitor can be advantageously employed in the range of high frequencies.

The inventive capacitor can be especially advantageously configured in that the composition of the ceramic is set such by means of a suitable selection of the parameter m that the temperature coefficient of the capacitor capacitance meets the demands of what are referred to as the "COG characteristic". The "COG characteristic" means that the temperature coefficient of the capacitance $\Delta C/\Delta T$ of a COG capacitor is less than 30 ppm/Kelvin in the temperature interval between $-55°$ C. and $125°$ C. Since the temperature coefficient of the capacitor capacitance is essentially dependent on the temperature coefficient of the dielectric constant of the ceramic mass employed, a minimization of the temperature coefficient of the capacitor capacitance can be achieved by means of a suitable compensation of the temperature coefficient of the individual phases of the ceramic.

In the material system $BaO-Nd_2O_3-TiO_2$, the compound $BaNd_2Ti_4O_{12}$, whose temperature coefficient of the dielectric constant $TK\epsilon_1$ amounts to approximately $-120$ ppm/K, can be combined with the compound $Nd_2Ti_2O_7$, which exhibits a temperature coefficient of the dielectric constant $TK\epsilon_2$ of approximately $+200$ ppm/K. The combination is based on the mixing rule $TK\epsilon = v_1 TK\epsilon_1 + v_2 TK\epsilon_2$ to form a heterogeneous phase mixture that yields a temperature coefficient of the capacitance $TKC = TK\epsilon + \alpha_L$ close to zero for the capacitor manufactured therewith. The symbol $v$ indicates the volume percent content of the constituents and $\alpha_L$ indicates the value of the coefficient of thermal expansion of the ceramic mass.

The sintering at temperatures <1030° C., which enables a common sintering with the Cu electrodes, is tapped given employment of an inert gas atmosphere with adequately low oxygen partial pressure in that the ceramic has a glass frit of the composition added to it as the sintering aid.

It is also advantageous that, due to the knowledge of the composition-dependency of the TKC values, a shift of the temperature coefficient $TK\epsilon$ toward either positive or negative values conditioned by the admixture of glass frit can be compensated with a designational modification of the composition (selection of the parameter value m).

One advantage of the invention is that the phase-heterogeneous mixture of the raw materials $BaCO_3$, $Nd_2O_3$, $TiO_2$, which is composed of $BaNd_2Ti_4O_{12}$ and $Nd_2Ti_2O_7$, is already accessible to the calcination at a conversion temperature of 1180° C. and that the sinter compression after the addition of a part of a glass frit can be implemented at 930° C. up to a maximum of 1030° C. in the presence of the Cu electrodes under an oxygen partial pressure $<10^{-2}$ Pa without the properties typical for the COG capacitors experiencing any deterioration as a consequence of a partial reduction.

The complete decarbonization of the green member produced during the course of the manufacturing process succeeds in a temperature range below the commencement of the sinter compression in that the process known from petrochemicals for decomposing hydrocarbons or, respectively, organic compounds, which are derived therefrom, into carbon dioxide and hydrogen under the influence of water steam at the elevated temperature ("steam cracking") is transferred onto the ceramic process. For example, a slightly negative free enthalpy can be estimated from the thermodynamic data for the decomposition of polyethylene glycol or polyacrylic acid as a binder according to the reaction

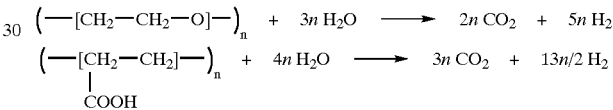

so that the procedure of decarbonization of the green members that must be undertaken in order to avoid an oxidation of the copper under nitrogen (oxygen partial pressure $<10^{-2}$ Pa) can sequence completely.

The invention is explained in greater detail below on the basis of exemplary embodiments and the FIGURE.

BRIEF DESCRIPTION OF THE DRAWINGS

The FIGURE shows an inventive capacitor in a partially cut perspective view by way of example.

DESCRIPTION OF THE PREFERRED EMBODIMENTS

The FIGURE shows an inventive capacitor with a base body 1 that comprises a respective contact layer 2, 3 at two opposite sides. The contact layers 2, 3 can be manufactured from a copper stoving paste. The base body 1 is composed of the inventive ceramic mass and forms the dielectric of the capacitor. Electrodes 4 that are advantageously composed of the copper and engage comb-like in one another are arranged inside the base body 1. The inventive ceramic mass is of such a nature that the capacitor can be manufactured by sintering on the basis of the common sintering of the ceramic mass with the copper electrodes.

The manufacture of the inventive ceramic mass and of the ceramic contained in the ceramic mass is described below on the basis of various exemplary embodiments:

By mixing the powdered initial substances $BaCO_3$, $Nd_2O_3$ and $TiO_2$ in the corresponding mol ratio and converting the mixture at 1180° C., the compounds $BaNd_2Ti_4O_{12}$ and $Nd_2Ti_2O_7$ are obtained as a mix wherein the negative temperature coefficient of the dielectric constant of the first compound and the positive temperature coefficient of the second compound supplement one another to a value close to zero based on the mixing rule $TK\epsilon = v_1 TK\epsilon_1 + v_2 TK\epsilon_2$ with $v_1$, $v_2$ as the volume percentages of the two constituents. Due to the relationship $TK\epsilon = -2 TKv_0 - 2 \alpha_L$, a setting of the temperature coefficient of the microwave resonant frequency $TKv_0$ to a value close to zero can likewise be achieved with a suitable selection of the composition, which enables an employment as the microwave resonator ceramic.

In order to check the validity of the mixing rule, the melange obtained after the conversion is first subject to a grinding process without the glass frit additive (average grain size about 0.6 μm). The fine-grained powder mixture that is obtained is subsequently converted into granules and the latter is compressed by pressing into disk-shaped specimens or cylindrical bodies suitable for resonance measurements and these are subsequently sintered for 6 hours at 1350 through 1380° C. to between 95 through 97% of the theoretically possible, maximum density. After such a procedure, for example, disk-shaped specimens (S) having a diameter of 12 mm and a height of 0.6 mm or, respectively, cylindrical specimens (Z) having a diameter of 10 mm and a height of 6.4 mm are obtained.

By applying electrodes, the disk-shaped specimens are suited for measuring the dielectric constant $\epsilon$, the loss angle tan δ at a frequency of 1 MHz and the temperature coefficient TKC of the capacitance of a capacitor formed with the ceramic. The measured values are recited in Table 1. The cylindrical specimens are suited for measuring the quality factor $Qv_0$ and the temperature coefficient of the resonant frequency $TKv_0$ of a microwave resonator formed from them, both of these being recited in Table 1.

Table 1 recites the ceramic specimens (S) and (Z) obtained by sintering at high temperature and having the following compositions:

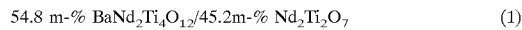

54.8 m-% $BaNd_2Ti_4O_{12}$/45.2m-% $Nd_2Ti_2O_7$     (1)

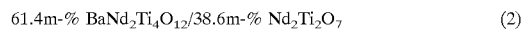

61.4m-% $BaNd_2Ti_4O_{12}$/38.6m-% $Nd_2Ti_2O_7$     (2)

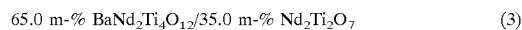

65.0 m-% $BaNd_2Ti_4O_{12}$/35.0 m-% $Nd_2Ti_2O_7$     (3)

The mass percent values (m-%) derive from the volume percentage $v_1$, $v_2$ estimated from the mixing rule upon employment of the density $\rho_1 = 5.79$ g/cm3 for $BaNd_2Ti_4O_{12}$ and $\rho_2 = 6.05$ g/cm3 for $Nd_2Ti_2O_7$. The calculated TKC values (TKC cal.) have been obtained according to the mixing rule $TK\epsilon = \Sigma_i\, v_i\, TK\epsilon_i$ (i=1, 2) upon employment of $TK\epsilon_1 = -111$ ppm/K for $BaNd_2Ti_4O_{12}$ and $TK\epsilon_2 = 217$ ppm/K for $Nd_2Ti_2O_7$ with the assumption of an expansion coefficient of the ceramic specimens $\alpha_L = 8$ ppm/K according to $TKC = TK\epsilon + \alpha_L$. The temperatures in the index of the TKC values indicate the interval in which the indicated TKC value was determined.

TABLE 1

Properties of ceramic specimens having the compositions (1), (2) and (3)

| Specimen | (S) ε | (S) tan δ [ppm/K] | (S) TKC [ppm/K] | $TKC_{+25/+125°C.}$ (cal.) [ppm/K] | (Z) $Qv_0$ [THz] | (Z) $TKv_{0+25/55°C.}$ [ppm/K] |
|---|---|---|---|---|---|---|
| (1) | — | <1 × 10⁻³ | $6.3_{-55/25°C.}$ $25_{25/125°C.}$ | 41 | — | — |
| (2) | 62 | 0.2 × 10⁻³ | $-15_{-55/25°C.}$ | 20.2 | 4.2 (at 5.6 GHz) | +14 |

TABLE 1-continued

Properties of ceramic specimens having the compositions (1), (2) and (3)

| Specimen | (S) ε | (S) tan δ [ppm/K] | (S) TKC [ppm/K] | $TKC_{+25/+125°C.}$ (cal.) [ppm/K] | (Z) $Qv_0$ [THz] | (Z) $TKv_{0+25/55°C.}$ [ppm/K] |
|---|---|---|---|---|---|---|
| (3) | 64 | 0.2 × 10⁻³ | $6_{45/125°C.}$ $-14_{-55/25°C.}$ $5_{45/125°C.}$ | 8.5 | 4.5 (at 5.4 GHz) | +20 |

The TKC values have been selected with a deviation toward positive amounts in order to thus take the lowering caused by the glass frit additive into consideration. Due to the absence of PbO, the ceramics assure an enhanced stability with respect to reduction in the sintering under inert conditions, for example under a nitrogen atmosphere.

Common sinterability with the copper electrodes is achieved in that the phase mixture of the compounds $BaNd_2Ti_4O_{12}$ and $Nd_2Ti_2O_7$ produced from the oxide constituents at 1180° C. is additively laced with 3 through 10 weight percent of the system $ZnO-B_2O_3-SiO_2$, preferably having the specific composition $(ZnO)_{58.5}(B_2O_3)_{31.45}(SiO_2)_{10.05}$, and the mixture is subjected to a grinding process in an aqueous suspension until an average grain size of 0.6 μm is obtained given approximately monomodal distribution.

After filtration and drying, the slurry obtained in this way is further-processed into granules upon addition of a pressing aid, disk-shaped or cylindrical green members being pressed therefrom or being processed into films immediately after addition of a suitable organic binder system or, respectively, being converted into a pressable granulate by spraying.

By applying Cu paste with silkscreening, the film is provided with an electrode structure suitable for capacitors of a specific capacitance and type, so that, following stacking, laminating and cutting, green parts are obtained that can be subjected to decarbonizing and sintering. The FIGURE shows the structure of such a multi-layer capacitor.

For decarbonization, the green members are exposed to a gas stream of purest nitrogen (2 through 5 l/min, residual oxygen partial pressure $<10^{-2}$ Pa) in a furnace with a controlled atmosphere, between 2 and 23 g water steam per hour being dosed thereto. Heating is first carried out to 400° C., held for two hours, subsequently brought to 680 through 750° C., whereby the complete decarbonization requires a reaction time of up to 6 hours. Subsequently, the delivery of water steam is reduced to about 1 g/h and the sinter compression is implemented at 900 through 1000° C.

Following the prescribed stoving curve of the appertaining copper paste, the outside Cu metallization occurs in a separate process step, likewise under purest nitrogen in the presence of water steam, in order to avoid a reducing modification of the ceramic due to the binder constituents contained in the paste.

Disk-shaped specimens S(Ø12–13 mm, thickness 0.6–0.7 mm) provided with Cu electrodes prove suitable for determining the dielectric ceramic properties.

Table 2 recites examples of disk specimens (S) of the inventive ceramic masses and of multi-layer capacitors (K) that were obtained on the basis of the ceramic masses

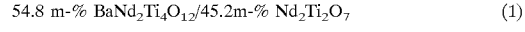

54.8 m-% $BaNd_2Ti_4O_{12}$/45.2m-% $Nd_2Ti_2O_7$     (1)

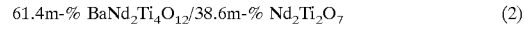

61.4m-% $BaNd_2Ti_4O_{12}$/38.6m-% $Nd_2Ti_2O_7$     (2)

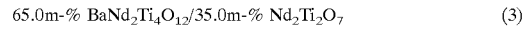

65.0m-% $BaNd_2Ti_4O_{12}$/35.0m-% $Nd_2Ti_2O_7$     (3)

68.0m-% BaNd$_2$Ti$_4$O$_{12}$/32.0m-% Nd$_2$Ti$_2$O$_7$ (4)

with a respective additive of 6 weight percent glass frit having the composition (ZnO)$_{58.5}$(B$_2$O$_3$)$_{31.45}$(SiO$_2$)$_{10.05}$. The specimens (S) and (K) have been produced as the result of a common sintering with the Cu electrodes. 24 multi-layer capacitors (K) having a capacitance of 89±1 pF were produced.

In addition to the respective sintering temperature T$_{sinter}$ and the sintering time t$_{Sinter}$, Table 2 indicates the relative density δ$_{rel.}$ in % referred to the theoretically maximally obtainable density as the criterion for the porosity of the specimens, the loss angle tan δ, TKC and the insulation resistance RIs of the ceramic specimens.

TABLE 2

Properties of ceramic specimens (S) and (K) on the basis of the above ceramic masses (1) . . . (4)

| Specimen | T$_{Sinter}$/t$_{Sinter}$ | ρ$_{rel}$ [%] | ε | tan δ (1MHz) | TKC [ppm/K] | RIs [MΩ] |
|---|---|---|---|---|---|---|
| S(1) | 1000° C./1 h | | 46 | 0.4 × 10$^{-3}$ | 75$_{-55/+25°C.}$ 85$_{+25/125°C.}$ | >10$^6$ |
| S(2) | 975° C./6 h | 98 | 54 | 0.4 × 10$^{-3}$ | 6$_{-55/+25°C.}$ −5$_{+25/125°C.}$ | >10$^6$ |
| S(2) | 950° C./6 h | 94 | 51 | 0.6 × 10$^{-3}$ | 6$_{-55/+25°C.}$ −4$_{+25/125°C.}$ | >10$^6$ |
| S(2) | 930° C./6 h | 97 | 53 | 0.5 × 10$^{-3}$ | 7$_{-55/+25°C.}$ −2$_{+25/125°C.}$ | 3 × 10$^5$ |
| S(2) | 1000° C./1 h | 97 | 46 | 0.4 × 10$^{-3}$ | −10$_{-55/+25°C.}$ −10$_{+25/125°C.}$ | >10$^6$ |
| S(3) | 975° C./6 h | 96 | 58 | 0.6 × 10$^{-3}$ | −13$_{-55/+25°C.}$ −11$_{+25/125°C.}$ | >10$^6$ |
| S(3) | 950° C./6 h | 98 | 55 | 0.6 × 10$^{-3}$ | −6$_{-55/+25°C.}$ −15$_{+25/125°C.}$ | >10$^6$ |
| S(3) | 930° C./6 h | 97 | 55 | 0.4 × 10$^{-3}$ | −15$_{-55/+25°C.}$ −36$_{+25/125°C.}$ | 2 × 10$^5$ |
| K(4) | 1000° C./3 h | | | 0.4 × 10$^{-3}$ | 5$_{+25/125°C.}$ | 2 × 10$^7$ |

The specimens S(2) and S(3) show that the admixture of 6% of the glass frit to the ceramic mass already enables an adequate sinter compression in the presence of the Cu electrodes beginning with 950° C. and that the material properties demanded of a COG capacitor ceramic are met.

The invention is not limited to the illustrated exemplary embodiments but is defined in its most general form by the patent claims.

We claim:

1. A ceramic mass comprising a phase-heterogeneous ceramic with an additive of glass frit, said phase-heterogeneous ceramic comprising m weight percent of a phase composed of BaNd$_2$Ti$_4$O$_{12}$ with a negative temperature coefficient of the dielectric constant and 100-m weight percent of a phase composed of Nd$_2$Ti$_2$O$_4$ with a positive temperature coefficient of a dielectric constant, wherein m has a value of 50<m<70; and wherein the glass frit contains ZnO, B$_2$O$_3$ and SiO$_2$ and has a weight amount of between 3 and 10 weight percent of the ceramic.

2. A ceramic mass according to claim 1, wherein the glass frit comprises a composition (ZnO)$_{58.5}$(B$_2$O$_3$)$_{31.45}$(SiO$_2$)$_{10.05}$.

3. A capacitor comprising a base body of ceramic, said base body, on two opposite sides, having contact layers and a plurality of electrodes engaging the contact layers and extending into the ceramic body comb-like relative to one another, said ceramic body being a ceramic mass comprising a phase-heterogeneous ceramic and an additive of glass frit, said phase-heterogeneous ceramic comprising m weight percent of a phase composed of BaNd$_2$Ti$_4$O$_{12}$ with a negative temperature coefficient of the dielectric constant and 100-m weight percent of a phase composed of Nd$_2$Ti$_2$O$_4$ with a positive temperature coefficient of a dielectric constant, wherein m has a value of 50<m<70; and wherein the glass frit contains ZnO, B$_2$O$_3$ and SiO$_2$ and has a weight amount of between 3 and 10 weight percent of the ceramic.

4. A capacitor according to claim 3, wherein the electrodes are composed of copper and the ceramic body is a sintered ceramic mass sintered with the copper electrode.

5. A capacitor according to claim 4, wherein the composition of the ceramic provides a temperature coefficient capacitance for the capacitor in a temperature interval between −55° C. and 125° C. and less than 30 ppm/Kelvin.

6. A capacitor according to claim 3, wherein the composition of the ceramic provides a temperature coefficient capacitance for the capacitor in a temperature interval between −55° C. and 125° C. and less than 30 ppm/Kelvin.

7. A capacitor according to claim 3, wherein the glass frit comprises a composition (ZnO)$_{58.5}$(B$_2$O$_3$)$_{31.45}$(SiO$_2$)$_{10.05}$.

8. A capacitor according to claim 7, wherein the composition of the ceramic provides a temperature coefficient capacitance for the capacitor in a temperature interval between −55° C. and 125° C. and less than 30 ppm/Kelvin.

9. A capacitor according to claim 7, wherein the electrodes are composed of copper, the ceramic mass is a sintered mass sintered together with the copper electrodes.

10. A capacitor according to claim 9, wherein the composition of the ceramic provides a temperature coefficient capacitance for the capacitor in a temperature interval between −55° C. and 125° C. and less than 30 ppm/Kelvin.

* * * * *